(12) United States Patent
Stohr et al.

(10) Patent No.: US 7,684,991 B2
(45) Date of Patent: Mar. 23, 2010

(54) DIGITAL AUDIO FILE SEARCH METHOD AND APPARATUS USING TEXT-TO-SPEECH PROCESSING

(75) Inventors: Luis Stohr, Torrance, CA (US); Satoshi Tanimoto, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 592 days.

(21) Appl. No.: 11/326,183

(22) Filed: Jan. 5, 2006

(65) Prior Publication Data

US 2007/0156410 A1    Jul. 5, 2007

(51) Int. Cl.
*G10L 11/00* (2006.01)
*G10L 13/00* (2006.01)
*G10L 13/08* (2006.01)

(52) U.S. Cl. .................... 704/270.1; 704/258; 704/260; 704/270

(58) Field of Classification Search .................... 700/94
See application file for complete search history.

(56) References Cited

U.S. PATENT DOCUMENTS 6,671,617 B2 * 12/2003 Odinak et al. ............... 701/202

2001/0028717 A1 * 10/2001 Ohmura et al. ............... 381/86
2002/0087224 A1    7/2002 Barile
2003/0215102 A1 * 11/2003 Marlowe ...................... 381/77
2006/0095848 A1 *  5/2006 Naik ........................... 715/716

* cited by examiner

*Primary Examiner*—David R Hudspeth
*Assistant Examiner*—Samuel G Neway
(74) *Attorney, Agent, or Firm*—Muramatsu & Associates (57) ABSTRACT

A digital audio file search method and apparatus for digital audio files is provided that allows a user to navigate the audio files by generating speech sounds related to the information of the audio files to facilitate searching and playback. The digital audio file search method and apparatus searches for audio files in a portable digital audio player in combination with an automobile audio system through speech sounds by utilizing text-to-speech processing and by prompting response from a user in response to the generated speech sounds. The text-to-speech technology is utilized to generate the speech sound based on tag-data of the audio files. When hearing the speech sounds, the user gives instruction for searching the files without being distracted from driving the automobile.

20 Claims, 6 Drawing Sheets

DIGITAL AUDIO FILE SEARCH METHOD AND APPARATUS USING TEXT-TO-SPEECH PROCESSING

FIELD OF THE INVENTION

This invention relates to a search and playback method and apparatus for audio files, and more particularly, to a digital audio file search method and apparatus for searching digital audio files in a portable digital audio player in combination with an automobile audio system through speech sounds of information associated with the digital audio files by utilizing text-to-speech processing which prompts a user step-by-step selection of the audio files in response to the speech sounds.

BACKGROUND OF THE INVENTION

Digital audio files, such as MP3, ATRAC (adaptive transform acoustic coding), WMA (windows media audio), AAC (advanced audio coding), etc. are popular media for listening music or audio dramas, comedies and the like. Digital audio files are generally stored in a storage medium such as a hard disk, CD-ROM, memory card, etc., installed in a small box. Such media have an advantage that, because of the compression technology, the size of each file is smaller than that of a conventional audio format used in a compact disk (CD) ROM. In addition to the audio data, a digital audio file contains tag-data (meta-data) that describe tag information such as, artist names, titles of music, genre of music, etc. Such information is often used by a digital audio player to display music information in a text format to help a user to identify the music.

Portable digital audio players, such as an ipod (Apple, Inc.), are popular due to their capability of storing a large amount of music and their portability. Typically, a user creates a library of favorite music in a portable digital audio player and listens to the music while working, studying, walking, or the like. The user also wants to listen to the music from his collection in the portable digital audio player even when he is driving an automobile or anyway in an automobile without using a headset of the portable digital audio player.

Thus, there is a demand to use such a portable digital audio player in combination with an automobile (vehicle) audio system so that a user can enjoy his preferred music or dramas, etc., stored in the portable digital audio player when the user is driving an automobile. In such an application, because a number of music files in such digital audio players is large, searching a particular audio file poses a significant problem when the user is driving an automobile.

Since the automobile audio system is usually used when the user is driving the vehicle, distraction of user's attention from the driving must be minimized. In particular, for safe driving, visual distraction should be minimized as much as possible when the user searches for next pieces of music stored in the portable digital audio player. Accordingly, there is a need of a new method of searching for desired music files in the portable digital audio player and playing the music files by an automobile audio system with minimum distraction from the driving.

SUMMARY OF THE INVENTION

Therefore, it is an object of the present invention to provide an audio file search method and apparatus for searching and selecting digital audio files in a portable digital audio player to playback the selected music by an automobile audio system.

It is another object of the present invention to provide an audio file search method and apparatus for searching and selecting digital audio files in a portable digital audio player in combination with an automobile audio system by utilizing text-to-speech processing.

It is a further object of the present invention to provide an audio file search method and apparatus for searching digital audio files by utilizing text-to-speech processing to generate speech sounds descriptive of information regarding the contents of the digital audio file and prompting the user to select the audio files in response to the generated speech sounds.

One aspect of the present invention is a method of searching audio files in a portable audio player in combination with an automobile audio system. The method is comprised of the steps of: reading tag-data associated with each audio file and producing voice data for information retrieved from the tag-data; creating a play list that lists the voice data produced based on the tag-data in an predetermined order where the voice data are linked to the associated audio files; storing the play list and the audio files in the portable audio player; connecting the portable audio player with the automobile audio system for sending the voice data in the play list and the audio files to the automobile audio system and receiving command signals from the automobile audio system; generating speech sounds based on the voice data in the play list by the automobile audio system in a predetermined order and accepting user's commands through the automobile audio system; and searching an audio file in the portable audio player based on the user's commands.

In the present invention, the step of producing the voice data for the information retrieved from the tag-data includes a step of converting text data to speech data through a text-to-speech conversion algorithm. Further, the step of creating the play list that lists the voice data includes a step of creating two or more layers of files containing the voice data which are linked to one another in a hierarchical structure.

In the present invention, the step of creating the play list that lists the voice data includes a step of arranging the voice data in an alphabetical order so that the automobile audio system generates the speech sounds associated with the audio files in the alphabetical order. Further, the step of creating the play list that lists the voice data includes a step of arranging the voice data in a user defined order so that the automobile audio system produces the speech sounds associated with the audio files in the user defined order.

In the present invention, the step of creating the play list that lists the voice data includes a step of creating two or more layers of files containing the voice data which are linked to one another in a hierarchical structure, and wherein one of the layers of voice data file lists alphabetical characters each indicating the first character of voice data in the next layer of voice data file.

In the present invention, the step of accepting the user's commands through the automobile audio system includes a step of providing an instruction to the automobile audio system when hearing the speech sound so that the command signals reflecting the user's instruction are sent to the portable audio player. Further, the step of providing the instruction to the automobile audio system includes a step of either pressing or releasing a button of the automobile audio system when the user hears a desired speech sound.

Another aspect of the present invention is an apparatus for searching audio files in a portable audio player in combination with an automobile audio system. The apparatus of the present invention is designed to implement the various steps of the method for searching the audio files noted above. The apparatus is configured to read the tag-data associated with each audio file and to produce the voice data, to create the play list having the voice data which are linked to the associated audio files, and to store the play list and the audio files in the portable audio player. When the portable audio player is connected to the automobile audio system, the apparatus enables to send the voice data in the play list and the audio files to the automobile audio system and receives command signals from the automobile audio system while generating speech sounds based on the voice data in the play list by the automobile audio system in the predetermined order and accepting user's commands through the automobile audio system, thereby searching for an audio file in the portable audio player in response to the user's commands.

According to the present invention, the digital audio file search method and apparatus is capable of searching for audio files in the portable digital audio player in combination with the automobile audio system through the speech sounds generated by utilizing the text-to-speech processing. The automobile audio system produces the speech sounds created by the text-to-speech processing, which prompts the user step-by-step selection of the audio files in response to the speech sounds. The automobile audio system plays the selected audio files. Thus, the search method and apparatus of the present invention can avoid visual distraction from the driving when searching for audio files in the portable digital audio player.

BRIEF DESCRIPTION OF THE DRAWINGS

FIGS. 5A and 5B are schematic diagrams showing an example of structure of text-to-speech files created by the configuration of FIG. 4, where FIG. 5A shows a layered structure of text-to-speech files in the play list and FIG. 5B shows a more detailed structure in the play list where each voice data is accompanied by address data.

DETAILED DESCRIPTION OF THE INVENTION

The present invention will be described in detail with reference to the accompanying drawings. The present invention provides a search and playback method and apparatus for searching digital audio files in a portable digital audio player to playback a selected audio content by an automobile audio system. Thus, the user can enjoy favorite music stored in the portable digital audio player when the user is driving an automobile. It should be noted that although the present invention will be described mainly for the case of searching and reproducing a favorite music, the present invention can be applied to other types of digital audio file such as related to drama, comedy, educational material, etc.

Today, a text-to-speech ("TTS") technology enables to generate speech sounds from text data by converting the text data to the voice data. As noted above, typically, digital audio files can be obtained from a service provider through a communication network such as Internet or by converting audio files from a CD ROM to a compressed digital audio files such as in an MP3 format through a CD player or a personal computer. Each digital audio file includes tag-data which shows bibliographical information of the file such as an artist's name, music title, year of recording, composer's name, etc.

In such a case, since the tag-data of each digital audio file is a form of text data, the TTS technology (text-to-speech conversion algorithm) enables to generate voice (speech sound) data based on the tag-data. That is, if a particular song's artist name is "Michael Jackson", the TTS technology is able to produce the voice data that generate speech sounds of the name "Michael Jackson" from an audio system based on the tag-data of the audio file. Thus, an automobile audio system implementing the search method and apparatus of the present invention produces the speech sounds such as the artist names, thereby providing the information to the user regarding the audio files in the portable digital audio player.

The present invention has a means to create TTS files to index each of the audio files by its artist name, music name or title, album name, genre, etc. so that the index is reproduced by the audio system by speech sound (voice data). Thus, when the user hears his favorite artist's name or the like, he presses (or releases) a key or button on the automobile audio system so that the automobile audio system produces speech sound indicating music names of the selected artist. Then, the user is able to select a particular music by pressing (or releasing) a key or button when he hears the particular music title announced by the speech sound. The automobile audio system retrieves the digital audio files of the selected music from the portable digital audio player and plays the selected music.

In the present invention, the TTS files having lists of voice data are created from tag information of each digital audio file by a software (text-to-speech conversion algorithm) installed in a personal computer. The software arranges the TTS files based on a predetermined order, such as an alphabetical order or an order specified by the user. As noted above, such tag information is, for example, extracted from the tag-data ("meta-data") of each digital audio file or created by a user from the information on the original file such as a CD ROM. The software assigns address data to each voice data in the TTS files. The TTS files created by the software in the personal computer are transferred to the portable digital audio player.

Figure 1:
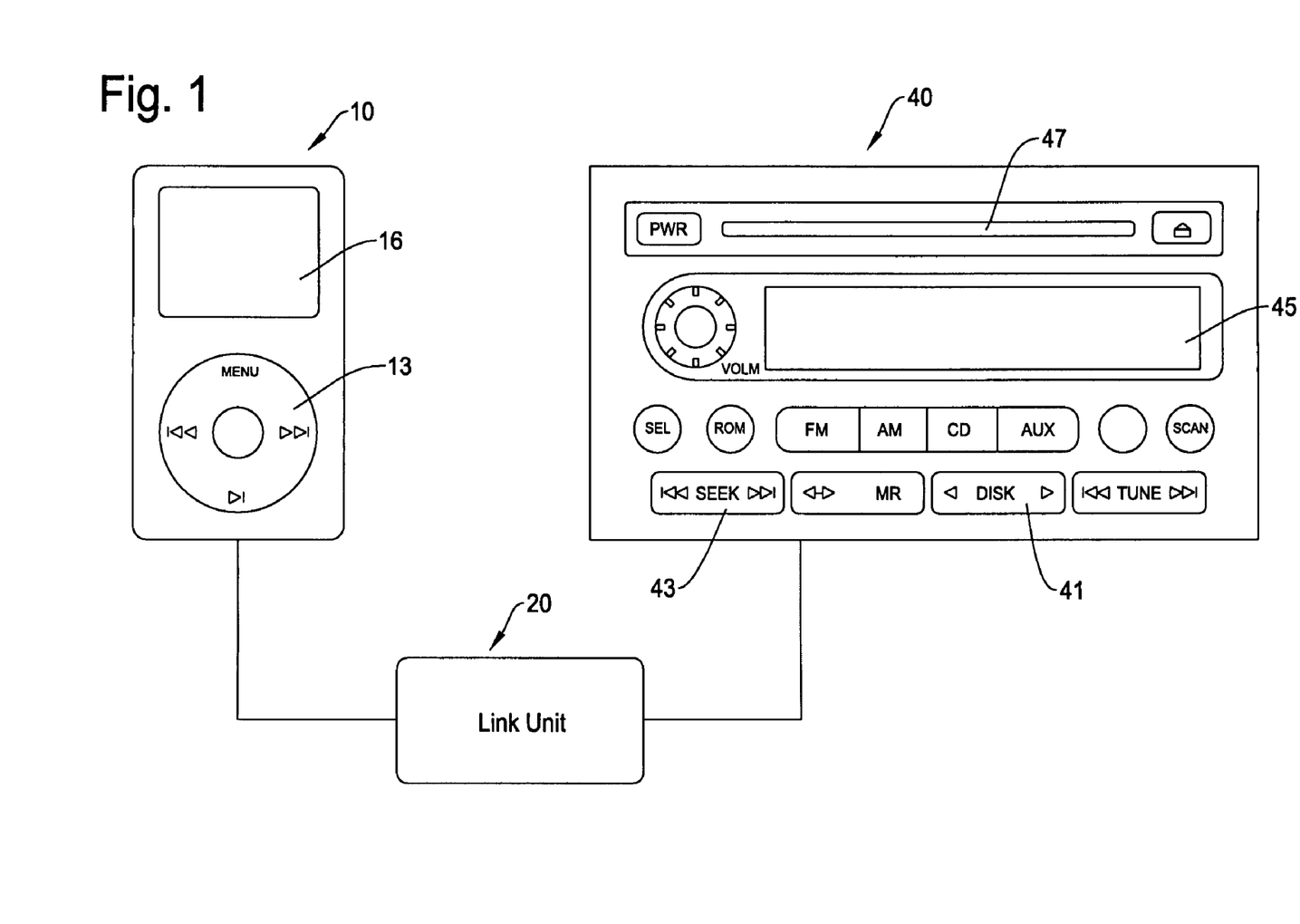
FIG. 1 is a schematic diagram showing an example of basic structure of an embodiment in the present invention where a portable digital audio player is connected an automobile audio system through a link unit.

A preferred embodiment of the present invention is described with reference to the accompanying drawings. FIG. 1 is a schematic diagram showing an overall configuration of the present invention which includes a portable digital audio player 10, such as an ipod (Apple, Inc.), connected to an automobile (vehicle) audio system 40 through a link unit 20. The portable digital audio player 10 has a display 16 to show information regarding music, artist, etc., and a control pad 13 to select menus or instructions. The automobile audio system 40 in this example is a CD or DVD player having a disk slot 47, a display 45, several keys and buttons, such as a track seek button 43 and a disk change button 41. The link unit 20 typically includes a micro-processor and acts as an interface between the portable digital audio player 10 and the automobile audio system 40.

Figure 2:
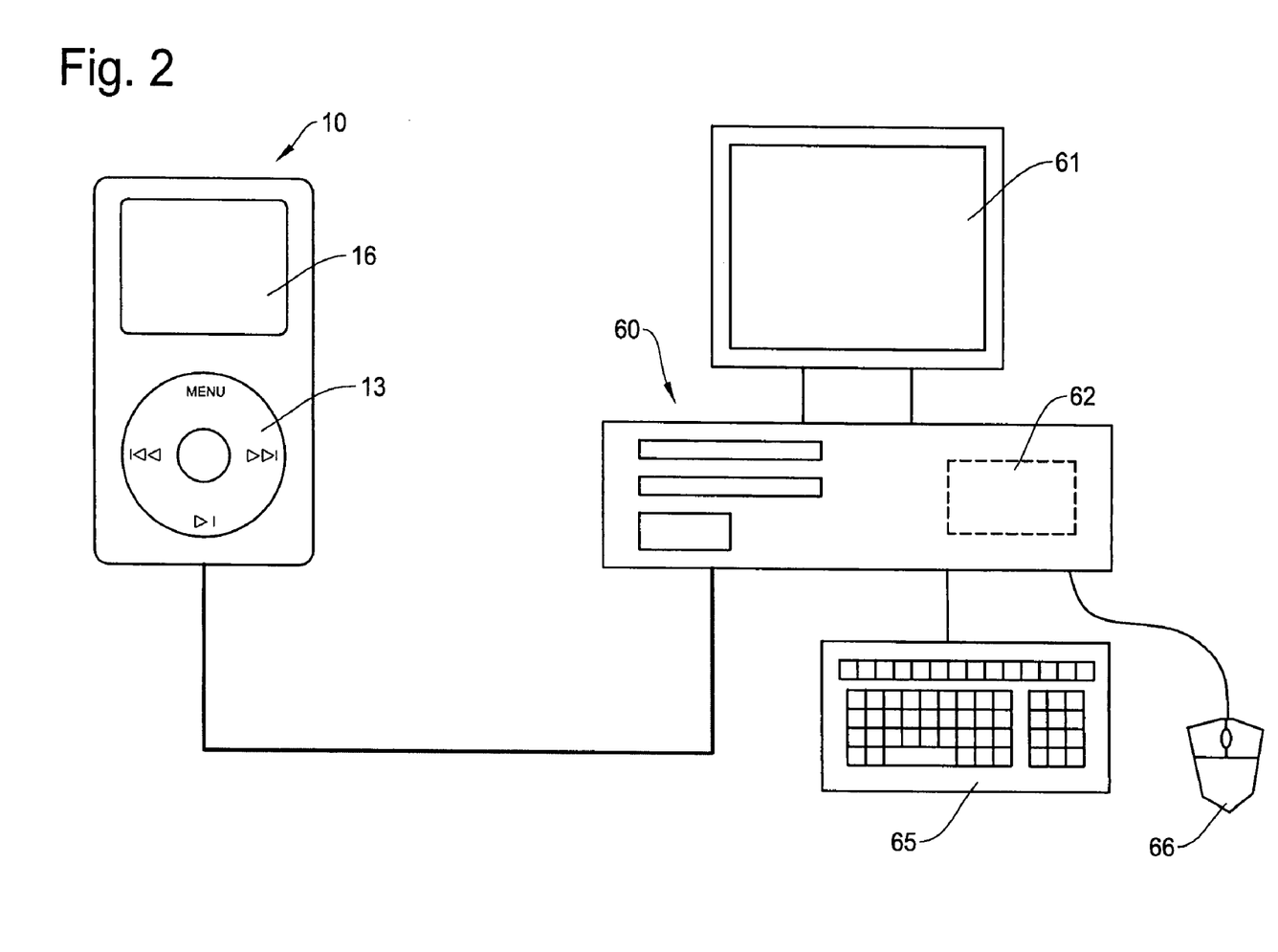
FIG. 2 is a schematic diagram showing an embodiment in the present invention where a portable digital audio player is connected a personal computer for transferring music files and play lists produced by the personal computer to the portable digital audio player.

Referring to FIG. 2, the portable digital audio player 10 can be connected to a personal computer 60 to receive digital audio files. Typically, digital audio files from a service provider are downloaded through a communication network such as Internet and stored in the personal computer 60. Alternatively, digital audio files can be created by converting the output of traditional audio media such as CDs and DVDs.

The personal computer 60 installs a software 60 to create the TTS files which are index data (voice data accompanied by address data) associated with the digital audio files in such a way that the index data can be audible when produced by the automobile audio system 40. The user can also add and modify the index data such as an order of music names for a particular artist through input means such as a keyboard 65 and a mouse 66. The personal computer 60 transfers the resultant index data and the digital audio files to the portable digital audio player 10.

Figure 3:
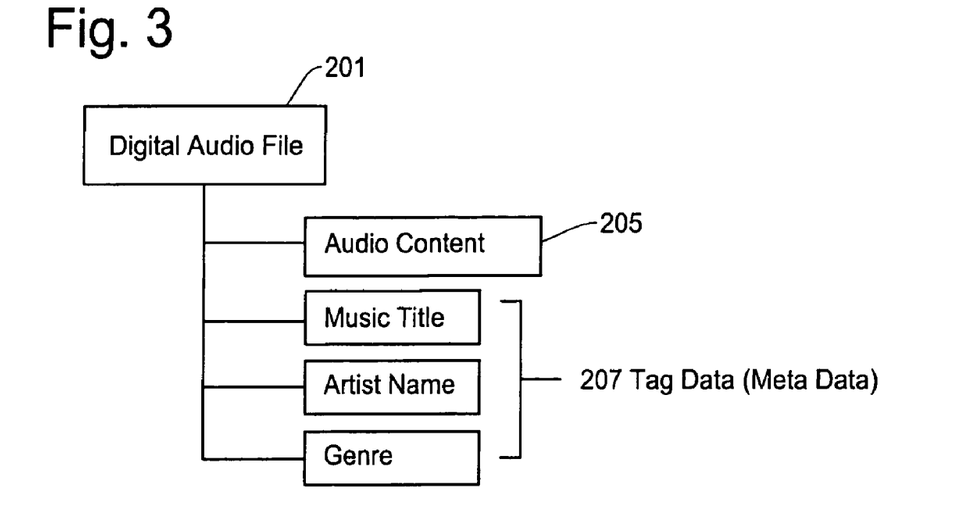
FIG. 3 is a schematic diagram showing a typical example of digital audio file which is configured by audio contents and tag data.

FIG. 3 schematically shows a typical structure of a digital audio file available currently in the market. Generally, as noted above, the digital audio file has tag-data ("meta-data") that describes the properties of the audio file. In the example of FIG. 3, such tag-data include a music title, artist's name, and genre of the music. Other information, such as a comment, track number, and year the music was created, may also be included in the tag-data. As will be explained in more detail later, in the present invention, speech files or TTS (text-to-speech) files are produced based on the tag-data by the software in the personal computer 60 so that the properties of the audio file are indexed by the voice data. Thus, the properties of the audio files are reproduced by the speech sounds through the automobile audio system, which facilitates a process of searching for audio files.

Figure 4:
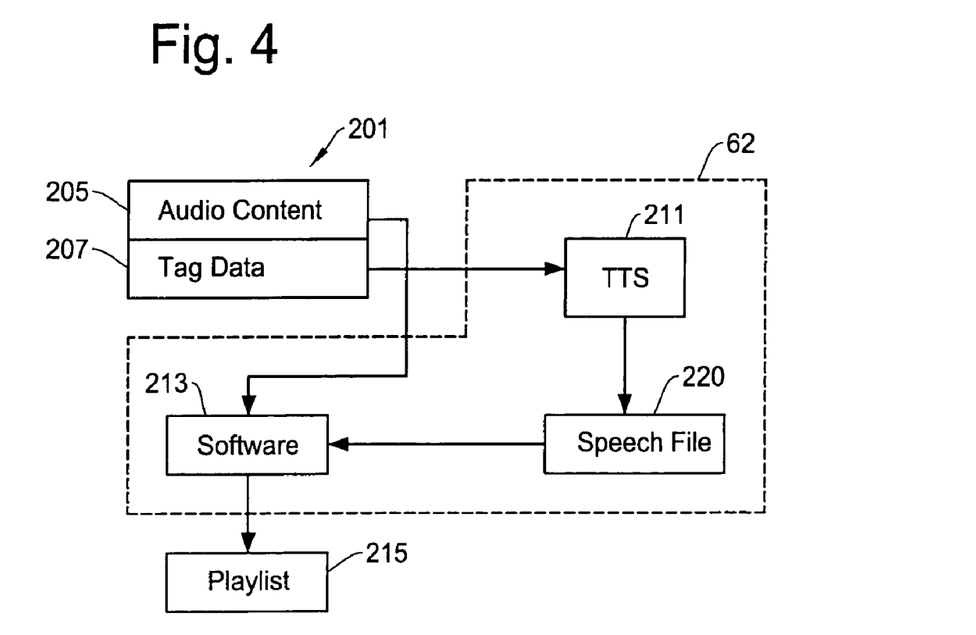
FIG. 4 is a schematic diagram showing an example of functional configuration for producing a text-to-speech file from a digital audio file to create a play list for use in the present invention.

Referring now to FIG. 4, a basic configuration for creating the TTS files is described, which is typically embodied in the personal computer 60 shown in FIG. 2. As noted above, the text-to-speech ("TTS") conversion technology is utilized for creating the voice data in the TTS files. FIG. 4 shows a TTS conversion engine 211, a speech file 220, and a link software 213 where these functional blocks may be included in the software 62 in the personal computer 60 of FIG. 2.

The TTS conversion engine 211 converts the text data in the audio file into voice data that can be reproduced as speech sounds. Typically, the TTS conversion engine 211 is implemented by a software but can be a dedicated hardware as well. The voice data is temporarily stored in the speech file 220. The link software 213 is provided to create a play list (TTS files) 215 which lists the voice data of various types such as artist's names, music title, genre, etc. The link software 213 also assigns address data to voice data where the address data is typically an alphanumerical entry of predetermined number of digits. The voice data are listed based on predetermined orders such as an alphabetical order or an order created by a user through the operation of the input devices 65 and 66 of the personal computer 60.

Typically, a digital audio file 201 is configured by an audio content 205 and tag-data (meta-data) 207 as noted above. The TTS conversion engine 211 reads the tag-data 207 to generate (convert from text data) the corresponding voice data which are compiled in the speech file 220. Typically, the TTS conversion engine 211 generates an alphabetical index, names of artists, titles of the music, and genres of music, etc. For example, if the tag-data 207 of the digital audio file 201 has an artist name of "Cher", the TTS conversion engine 211 generates voice data that produces an speech sound of "Cher" by the automobile audio system 40. The generated voice data in the speech file 220 is in a format that can be recognized and played by the automobile audio system 40 and preferably also can be recognized and played by the portable digital audio player 10. The link software 213 links locations of the voice data in the speech files 220 and the audio contents 205 by assigning the addresses to the voice data and audio contents.

In this manner, the software 62 of FIG. 4 produces the play list 215. The play list 215 is a list of data that describe the relationship among the generated voice data from the speech file 220 in a layered structure as well as with the audio content 205 (digital audio data). The play list 215 is transferred to the portable digital audio player 10 from the personal computer 60 through the configuration shown in FIG. 2. For the purpose of the present invention, as shown in FIG. 1, the portable digital audio player 10 is connected to the automobile audio system 40 through the link unit 20.

Figure 5A:
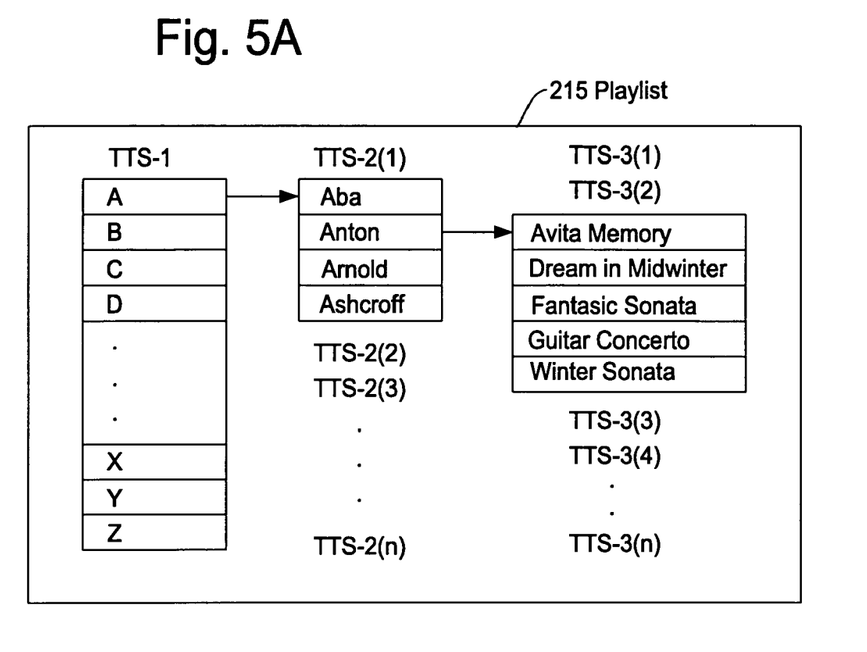
Figure 5B:
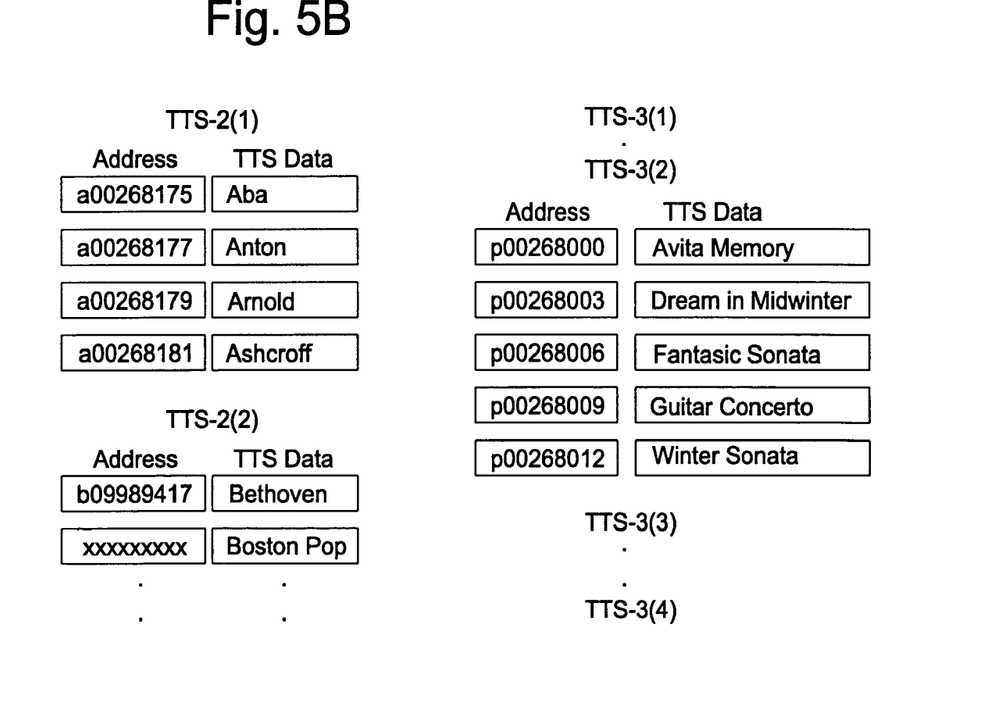

FIGS. 5A and 5B show an example of structure of the play list 215, i.e., the TTS files, produced by the software 62 of FIG. 4. As shown in FIG. 5A, to enable the search for digital audio files in a step-by-step manner, the TTS files are arranged in a layered structure. In this example, the play list 215 is configured by three layers of TTS files, i.e., TTS-1, TTS-2, and TTS-3. In other words, the play list 215 has a hierarchical structure in which voice data are linked in a tree like relationship.

As shown in FIG. 5B, each voice data is accompanied by address data so that the voice data or the audio content can be retrieved from the portable digital audio player 10 in response to the read command from the link unit 20. As noted above, the address data is assigned to each voice data in the TTS files through the software 62 in the personal computer 60. As also noted above, the address data is typically an alphanumerical entry configured by a predetermined number of digits.

The TTS-1 file includes a list of voice data corresponding to alphabetical characters so that the automobile audio system can produce the voice sound pronouncing each alphabet character in a predetermined order. The alphabetical characters indicate the first character of names of artist, music titles, etc. of the digital audio files in the portable digital audio player 10. The order of the voice data can be determined freely by the user at his preference or can be determined by the link software 213, for example, in the alphabetical order when creating the play list 215.

In this example, the TTS-2 files include voice data indicating names of artist which are linked to the voice data in the TTS-1 file. The TTS-2 files are configured by TTS-2(1), TTS-2(2), . . . TTS-2(n) files where each file is linked to the corresponding alphabetical character in the TTS-1 file. For example, the voice data of the alphabetical character "A" in the TTS-1 file is linked to the TTS-2(1) file which lists the voice data of artist's names that start with the alphabetical character "A", for example, "Aba", "Anton", "Arnold" and "Ashcroff". The TTS-2(2), TTS-2(3), . . . TTS-2(n) files are also created in the manner similar to that described above.

In this example, the TTS-3 files include voice data indicating names of music which are linked to the voice data in the TTS-2 files. The TTS-3 files are configured by TTS-3(1), TTS-3(2), . . . TTS-3(n) files where each file is linked to the corresponding artist's name in the TTS-2 file. For example, the voice data of the artist's name "Anton" in the TTS-2(1) file is linked to the TTS-3(2) file which lists the voice data of music titles of the artist "Anton" such as "Avita Memory", "Dream in Midwinter", etc. The corresponding digital audio data (audio content) of the music are either contained in the TTS-3 files or linked to the TTS-3 files. The TTS-3(1), TTS-2(3), . . . TTS-2(n) files corresponding to other artists are also created in the manner similar to that described above.

As shown in FIG. 5A, the TTS files of alphabetical characters, artist's names, music titles and digital audio files are linked to one another in a hierarchial structure. Namely, the voice data for alphabetical characters (TTS-1 file) are linked to the voice data of the artist's names (TTS-2 files). The voice data for the artist's names (TTS-2 files) are linked to the voice data of the music titles (TTS-3 files) which are linked to the corresponding audio contents (digital audio files).

Thus, when the user activates the automobile audio system 40 to which the portable digital audio player 10 is connected, the automobile audio system 40 produces a voice message that announces the alphabetical characters in the predetermined order. The user selects a particular alphabet, for example, a character "A" because his favorite musician's name starts with the character "A" by pressing (or releasing) a key or button when the character "A" is pronounced. Then, the automobile audio system 40 reads aloud the names of the artist that start with the character "A" in the predetermined order. When the user further selects a particular artist's name, the automobile audio system 40 reads aloud the music titles of the selected artist in the predetermined order.

Thus, the user can select a particular music title of the selected artist by pressing (or releasing) the key when he hears the speech sound of the particular music title. The automobile audio system 40 retrieves the digital audio file of the selected music title and plays the selected music. Since the automobile audio system 40 reads aloud the alphabet characters, artist's names, and the music titles, the user need not have to look at the display of the audio player 10 or the automobile audio system 40. Thus, the search method and apparatus of the present invention can therefore avoid visual distraction from the driving when searching the music files in the portable digital audio player 10. It should be noted that, in the foregoing example, although the alphabetical characters are used for illustration purpose, other characters can be used depending on a particular language environment where the digital audio player and automobile audio system are used.

Figure 6:
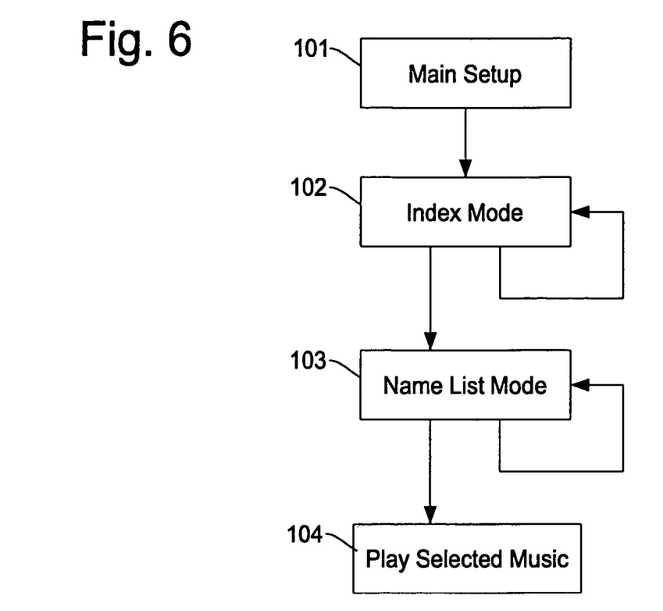
FIG. 6 is a flow chart showing the basic operation for searching an intended audio file by responding to the speech sounds made by the audio file search method and apparatus of the present invention.
Figure 7:
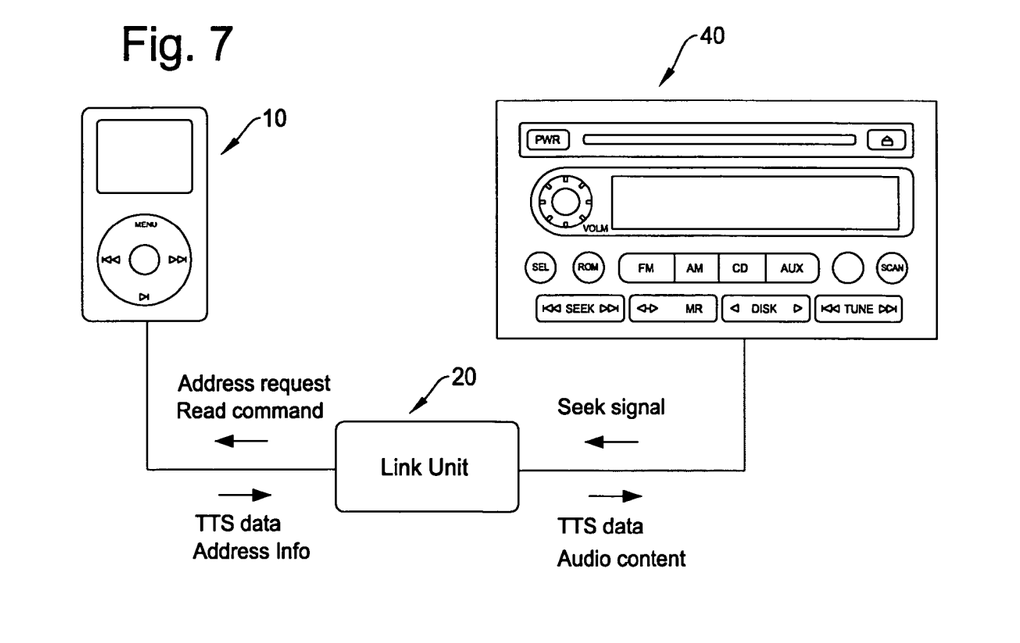
FIG. 7 is a schematic diagram showing the basic operation for searching an intended audio file by responding to the speech sounds in accordance with the audio file search method and apparatus of the present invention.

The operation of the present invention for searching a music title by a particular musician is described with reference to FIGS. 1, 6 and 7. In FIGS. 1 and 7, the portable digital audio player 10 is connected to the automobile audio system 40 through the link unit 20. The connection may be established wirelessly or through a physical wire. The automobile audio system 40 includes a seek button 43 and a disk button 41 among other keys and buttons. The portable digital audio player 10 stores the play list 215 produced by the personal computer 60 and the digital audio files.

As noted above with reference to FIGS. 4 and 5A-5B, the play list is a set of TTS files that have the voice data indicating the alphabetic characters, artist's names and the music titles which are arranged in a layered structure. Each voice data and the digital audio file are assigned by the address data, thus, can be specified when the address data is provided to the portable digital audio player 10. In the present invention, typically, the link unit 20 interprets seek signals from the automobile audio system 40 and sends the address data to the portable digital audio player 10 to retrieve the voice data or audio content.

As noted above, the link unit 20 acts as an intermediary between the portable digital audio player 10 and the automobile audio system 40. As shown in FIG. 7, the link unit 20 converts a seek signal (user's commands) from the automobile audio system 40 to an instruction code that can be understood by the portable digital audio player 10. For example, the instruction code is a command requesting information on address of the voice data corresponding to the seek signal. In response, the portable digital audio player 10 sends the requested address information to the link unit 20. Based on the address information, the link unit 20 sends the address data to the portable digital audio player 10 to retrieve the voice data. Further, the link unit 20 sends the retrieved voice data to the automobile audio system 40 to produce the next speed sound. By repeating the above procedure, the desired digital audio file (audio content) can be selected by the user and the selected audio content is reproduced by the automobile audio system 40.

In this example, the seek button 43 is used for tracking-up and tracking-down operations, and the disk button 41 is used for upward search and downward search operations of the voice data and audio file in the portable digital audio player 10. When the user presses the right side of the seek button 43 (tracking-up) or the left side of the seek button 43 (tracking-down), corresponding instruction codes are generated by the automobile audio system 40. Likewise, when the user presses the right side of the disk button 41 (upward search) or the left side of the seek button 43 (downward search), corresponding instruction codes are generated by the automobile audio system 40. Those instruction codes (seek signals) are converted by the link unit 20 to communicate with the portable digital audio player 10.

Referring to the flow chart of FIG. 6, the basic operational flow of the present invention is described below. The user first sets up the search method in step 101. For example, the user may choose to search a digital audio file (music) by an artist's name, a title of music, or genre of music. The user will press the disk button 41 of the automobile audio system 40 for upward search or downward search to select the search mode. In addition to the above-described search categories, a random mode that plays music files at random may also be implemented.

Assuming that the user has selected to find a music by artist's name, an index mode for selecting a starting character of artist names begins in step 102. In this step, the TTS index data, such as the voice data in the TTS-1 file (FIG. 5), is read aloud by the automobile audio system 40 in a predetermined order and speed. That is, the portable digital audio player 10 sequentially sends the voice data of the initial alphabet letters of artist names (ex. TTS-1 file shown in FIG. 5) to the automobile audio system 40 by repeating the procedure described above with reference to FIG. 7.

Thus, the automobile audio system 40 produces speech sounds which announce the initial alphabet characters of the artist names. While listening to the speech sounds of the alphabet letters, the user can instruct the portable digital audio player 10 about the first alphabetical character of the desired artist's name by, for example, pressing the seek button 43 on the automobile audio system 40. For example, the automobile audio system 40 continues reading aloud the alphabetical characters in a predetermined order such as A, B, C, . . . When the automobile audio system 40 reads out "C", the user can press or tap the seek button 43 to instruct the portable digital audio player 10 that the user wants to find the artist whose name starts with the character "C".

When the user selects a particular alphabet letter, the name list mode (step 103) will start. Thus, if the letter "C" has been selected, the artist names that start with the letter "C" are produced by voice sounds. For example, FIG. 8 shows the list of the names of artists that begin with a letter C arranged in an alphabetical order.

When the TTS play list is created by the personal computer 60, the speech files (ex. TTS-2 files in FIG. 5) for artist name have been created as described with reference to FIGS. 4 and 5. The automobile audio system 40 will read aloud the names of artist, in this case, "Cake", "Cars", "Cassidy, Eva", etc., in the alphabetical order. Alternatively, the order of the artist's names can be determined by the user at his preference when creating the TTS files. When the digital audio player reads out "Cassidy, Eva", the user can press or tap the seek button 43 to instruct the audio player 10 through the link unit 20 that the user wants to find songs (digital audio files) by the artist named "Eva Cassidy".

Figure 8:
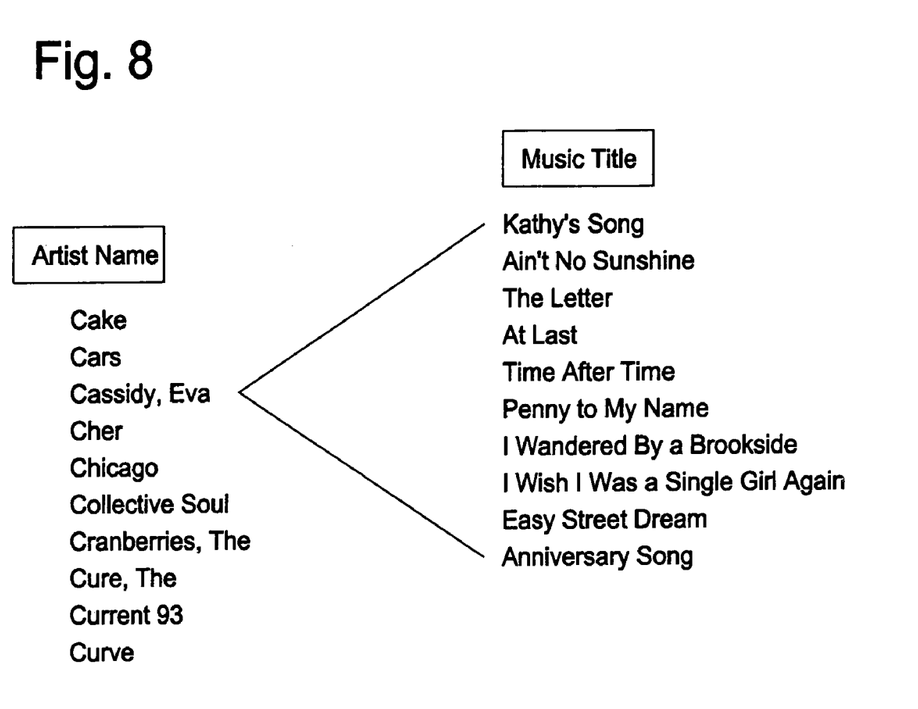
FIG. 8 is a schematic diagram showing an example of text-to-speech voice data in the artist list file and the music title file associated with the basic operational flow of FIG. 6.

In the example shown in FIG. 8, the TTS file of artist's names may place the last name followed by the first name as in the case of "Cassidy, Eva". Moreover, an article such as "the" or "a" may be omitted or may be placed last as in the case of "Cranberries, The" or "Cure, The" to accurately arrange the artist's last names in the alphabetical order. As noted above, the speech file of an artist name can be linked to actual audio files. Thus, when the user selects a particular name of an artist, the portable digital audio player 10 will send the music by selected artist to the automobile audio system 40 so that the music are replayed in step 104.

Alternatively, when the user has selected the artist's name, the process moves to a music title mode in which portable digital audio player 10 sends the TTS file listing the music titles of the selected artist. Thus, the automobile audio system 40 generates the speech sounds which sequentially announce the music titles of the artist "Cassidy, Eva" by repeating the procedure described above with reference to FIG. 7. For example, the voice sounds lead aloud the music titles of "Kathy's Song", "Ain't no Sunshine", "The Letter" and so on. When the favorite music title is announced, the user presses or taps the seek button 43 to specify the music title of "Cassidy, Eva".

In the example described above, in the first main setup (step 101 in FIG. 6), the user has selected a search method to search the music files in the portable digital audio player 10 by an artist name. However, other categories may also be utilized in searching for music files in the similar manner described above. For example, the user can search the music files through album titles or genre of the music.

Moreover, in the example described above, the index mode lists and reads aloud alphabet letters for artist name so that vehicle audio system can narrow down the music files for artist names starting with a selected alphabet letter. However, the alphabet index may include several categories such as artist names, album names, and genres. Thus, for example, when the user has selected the letter "C" in the index mode, the audio system reads aloud artist names, album names and genres that start with the letter "C".

Although the searching method using the speech file under the present invention is described in the condition that is implemented in an automobile audio system, the search method of the present invention can be utilized solely by the portable digital audio player or in combination with other types of audio systems such as a home audio system, etc.

As has been described above, according to the present invention, the digital audio file search method and apparatus is capable of searching for audio files in the portable digital audio player in combination with the automobile audio system through the speech sounds generated by utilizing text-to-speech processing. The automobile audio system produces the speech sounds created by the text-to-speech processing, which prompts the user step-by-step selection of the audio files in response to the speech sounds. The automobile audio system plays the selected audio files. Thus, the search method and apparatus of the present invention can avoid visual distraction from the driving when searching the audio files in the portable digital audio player.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of searching audio files in a portable audio player in combination with an automobile audio system, comprising the following steps of:
    reading meta-tag data associated with each audio file and producing voice data files for information retrieved from the meta-tag data;
    creating a play list that lists the voice data files produced based on the meta-tag data in an predetermined order where each of the voice data files and audio files is accompanied by address data;
    storing the play list and the audio files in the portable audio player;
    connecting the portable audio player with the automobile audio system for sending the voice data files in the play list and the audio files to the automobile audio system and receiving command signals from the automobile audio system;
    generating speech sounds that successively and automatically read aloud the data in the voice data files in the play list by the automobile audio system in a predetermined order and speed;
    accepting user's commands made in response to the speech sounds where the user's commands are transmitted through the automobile audio system to the portable audio player; and
    searching an audio file in the portable audio player based on the user's commands;
    wherein the speech sounds generated from the automobile audio system include a series of information on audio files so that a particular audio file is specified when both the information on the particular audio file is announced by the speech sounds and the user's commands are issued.

2. A method of searching an audio file as defined in claim 1, wherein said step of producing the voice data files for information retrieved from the meta-tag data includes a step of converting text data to speech data through a text-to-speech conversion algorithm.

3. A method of searching an audio file as defined in claim 1, wherein said step of creating the play list that lists the voice data files includes a step of creating two or more layers of files containing the voice data files which are linked to one another in a hierarchical structure.

4. A method of searching an audio file as defined in claim 1, wherein said step of creating the play list that lists the voice data files includes a step of arranging the voice data files in an alphabetical order so that the automobile audio system generates the speech sounds associated with the audio files in the alphabetical order.

5. A method of searching an audio file as defined in claim 1, wherein said step of creating the play list that lists the voice data files includes a step of arranging the voice data files in a user defined order so that the automobile audio system produces the speech sounds associated with the audio files in the user defined order.

6. A method of searching an audio file as defined in claim 1, wherein said meta tag data includes at least an artist name and a title of music that associated with each of the audio files.

7. A method of searching an audio file as defined in claim 1, wherein said step of creating the play list that lists the voice data files includes a step of creating two or more layers of files containing the voice data files which are linked to one another in a hierarchical structure, and wherein one of the layers of voice data files lists alphabetical characters each indicating the first character of voice data files in the next layer of voice data file, and wherein the alphabetical characters are read aloud through the automobile audio system to prompt a user to command the portable audio player through the automobile audio system.

8. A method of searching an audio file as defined in claim 1, wherein said step of accepting the user's commands through the automobile audio system includes a step of providing an instruction to the automobile audio system when hearing the speech sound so that the command signals reflecting the user's instruction, which indicates at when the voice data files are read aloud and at when the user produces the commands, are sent to the portable audio player.

9. A method of searching an audio file as defined in claim 8, wherein said step of providing the instruction to the automobile audio system includes a step of either pressing or releasing a button of the automobile audio system when the user hears a desired speech sound.

10. A method of searching an audio file as defined in claim 1, further comprising a step of receiving the audio file selected by the user from the portable audio player and reproducing the audio file through the automobile audio system.

11. An apparatus for searching audio files in a portable audio player in combination with an automobile audio system, comprising:

means for reading meta-tag data associated with each audio file and producing voice data files for information retrieved from the meta-tag data;

means for creating a play list that lists the voice data files produced based on the meta-tag data in an predetermined order where each of the voice data files and audio files is accompanied by address data;

means for storing the play list and the audio files in the portable audio player;

means for connecting the portable audio player with the automobile audio system for sending the voice data files in the play list and the audio files to the automobile audio system and receiving command signals from the automobile audio system;

means for generating speech sounds that successively and automatically read aloud the data in the voice data files in the play list by the automobile audio system in a predetermined order and speed;

means for accepting user's commands made in response to the speech sounds where the user's commands are transmitted through the automobile audio system to the portable audio player; and means for searching an audio file in the portable audio player based on the user's commands;

wherein the speech sounds generated from the automobile audio system include a series of information on audio files so that a particular audio file is specified when both the information on the particular audio file is announced by the speech sounds and the user's commands are issued.

12. An apparatus for searching an audio file as defined in claim 11. wherein said means for producing the voice data files for information retrieved from the meta-tag data includes means for converting text data to speech data through a text-to-speech conversion algorithm.

13. An apparatus for searching an audio file as defined in claim 11, wherein said means for creating the play list that lists the voice data files includes means for creating two or more layers of files containing the voice data files which are linked to one another in a hierarchical structure.

14. An apparatus for searching an audio file as defined in claim 11, wherein said means for creating the play list that lists the voice data files includes means for arranging the voice data files in an alphabetical order so that the automobile audio system generates the speech sounds associated with the audio files in the alphabetical order.

15. An apparatus for searching an audio file as defined in claim 11, wherein said means for creating the play list that lists the voice data files includes means for arranging the voice data files in a user defined order so that the automobile audio system produces the speech sounds associated with the audio files in the user defined order.

16. An apparatus for searching an audio file as defined in claim 11, wherein said meta-tag data includes at least an artist name and a title of music that associated with each of the audio files.

17. An apparatus for searching an audio file as defined in claim 11, wherein said means for creating the play list that lists the voice data files includes means for creating two or more layers of files containing the voice data files which are linked to one another in a hierarchical structure, and wherein one of the layers of voice data files lists alphabetical characters each indicating the first character of voice data files in the next layer of voice data file, and wherein the alphabetical characters are read aloud through the automobile audio system to prompt user's command.

18. An apparatus for searching an audio file as defined in claim 11, wherein said means for accepting the user's commands through the automobile audio system includes means for providing an instruction to the automobile audio system when hearing the speech sound so that the command signals reflecting the user's instruction, which indicates at when the voice data files are read aloud and at when the user produces the commands, are sent to the portable audio player.

19. An apparatus for searching an audio file as defined in claim 18, wherein said means for providing the instruction to the automobile audio system a button of the automobile audio system which is either pressed or released when the user hears a desired speech sound.

20. An apparatus for searching an audio file as defined in claim 11, further comprising means for receiving the audio file selected by the user from the portable audio player and reproducing the audio file through the automobile audio system.

* * * * *